United States Patent [19]

Long et al.

[11] Patent Number: 5,274,766
[45] Date of Patent: Dec. 28, 1993

[54] UNIVERSAL KEYBOARD AND KEYBOARD/SPATIAL INPUT DEVICE CONTROLLER

[75] Inventors: Marty L. Long, Mesa; James Ward, Gilbert, both of Ariz.

[73] Assignee: VLSI Technology, Inc., San Jose, Calif.

[21] Appl. No.: 583,732

[22] Filed: Sep. 14, 1990

[51] Int. Cl.$^5$ .......................................... G06F 3/023
[52] U.S. Cl. .................................. 395/275; 400/485;
364/221.1; 364/221.6; 364/238.3; 364/234;
364/709.12; 364/DIG. 1; 345/168
[58] Field of Search ........... 395/275; 364/234, 709.12,
364/221.1, 221.6, 238.2, 238.3, 926.93, 927.99,
929.12, DIG. 1, DIG. 2; 400/485; 340/711, 706

[56] References Cited

U.S. PATENT DOCUMENTS

| | | | |
|---|---|---|---|
| 4,774,689 | 9/1988 | Morisawa | 364/900 |
| 4,959,860 | 9/1990 | Watters et al. | 380/4 |
| 5,049,863 | 9/1991 | Oka | 340/710 |
| 5,056,057 | 10/1991 | Johnson et al. | 364/900 |
| 5,097,506 | 3/1992 | Kaiser, Jr. et al. | 380/25 |
| 5,124,689 | 6/1992 | Franz et al. | 340/711 |

*Primary Examiner*—Robert L. Richardson
*Assistant Examiner*—Diane E. Smith
*Attorney, Agent, or Firm*—LaValle D. Ptak

[57] ABSTRACT

A combination keyboard and keyboard/mouse controller system is capable of use with different types of personal computers, using either a keyboard input alone or a keyboard/mouse combination. The controller is configured with a hardware transceiver in it, and includes interconnections between an accumulator and a microsequencer portion and a transceiver for effecting the transfer of data to and from the computer and the keyboard or keyboard/mouse combination. The configuration of the controller circuitry is such that logic gates and multiplex transmission gates are employed between various ones of the input terminals to which signals are applied, and output terminals to which signals are provided. These gates interconnect at least some of these terminals in different combinations in different modes of operation of the controller system, depending upon whether a computer uses a keyboard alone as a data input device or is operated with a combination of a keyboard and mouse. The switching from one of these modes of operation to the other is effected by means of a binary control signal applied on a common terminal to the controller circuit.

4 Claims, 5 Drawing Sheets

UNIVERSAL KEYBOARD AND KEYBOARD/SPATIAL INPUT DEVICE CONTROLLER

RELATED APPLICATION

This application is related to co-pending application Ser. No. 07/474,917 filed on Feb. 5, 1990 and assigned to the same assignee as the present application.

BACKGROUND

Personal computers (PC's) currently are manufactured in two general versions, one of which uses a keyboard only and the other of which uses a keyboard and a spatial input device known as a "mouse." As discussed in the above identified co-pending application, the most popular personal computers currently are manufactured by the IBM Corporation. Currently, IBM manufactures a "keyboard only" personal computer which carries the designation "AT" and a keyboard/mouse combination computer under the designation "PS/2." As mentioned in the above identified copending application, even though both of these computers are made by the same manufacturer, the translation of the signals which are supplied from the keyboard to the computer occurs at different operating times. In addition, at least some of the translations for some of the keys in the keyboard are different. Consequently, the system described in the above identified co-pending application was developed to provide a single chip key code translation system, capable of operation with either of these two types of computers.

In conventional IBM AT or PS/2 computer systems, the keyboard controller is implemented using a general purpose peripheral controller. This implementation requires all of the transmit/receive interfaces with the keyboard to be performed in firmware which is relatively slow and requires code space. A significant disadvantage also exists inasmuch as the receiver cannot be active while other parts of the code are being executed by the controller. The standard keyboard controllers for the IBM AT and PS/2 are configured or defined differently. Two different controllers, with different firmware, are needed to interface keyboards with the two types of computers. Consequently, it is necessary for retailers and users to stock two different parts, and for purchasers to identify specifically which type computer, AT or PS/2, is to be used with the controller.

It is desirable to provide a dedicated keyboard/mouse controller which is capable of use with different types of personal computers, which is fast in operation, small in size, and reduces the code space required.

SUMMARY OF THE INVENTION

It is an object of this invention to provide an improved keyboard controller.

It is another object of this invention to provide an improved keyboard/mouse controller for personal computers.

It is an additional object of this invention to provide an improved keyboard/mouse controller in a single chip incorporating necessary circuitry for permitting utilization of the controller with at least two different types of personal computers.

In a preferred embodiment of the invention, the keyboard/mouse controller system receives signals on one port from the CPU which are indicative of the particular one of two different types of personal computers connected to the controller. The controller processes the received signals to configure output signals applied on an output port to the keyboard or mouse, to permit an automatic correct interface between the keyboard or a combination of keyboard and mouse. The internal circuitry of the controller is configured with coincidence gates and multiplex circuits which automatically effect the necessary signal path switching to accomplish the correct controller interface between the computer CPU and the keyboard or keyboard/mouse combination.

DETAILED DESCRIPTION

Reference now should be made to the drawings in which the same reference numbers are used throughout the different figures to designate the same components.

Figure 1:
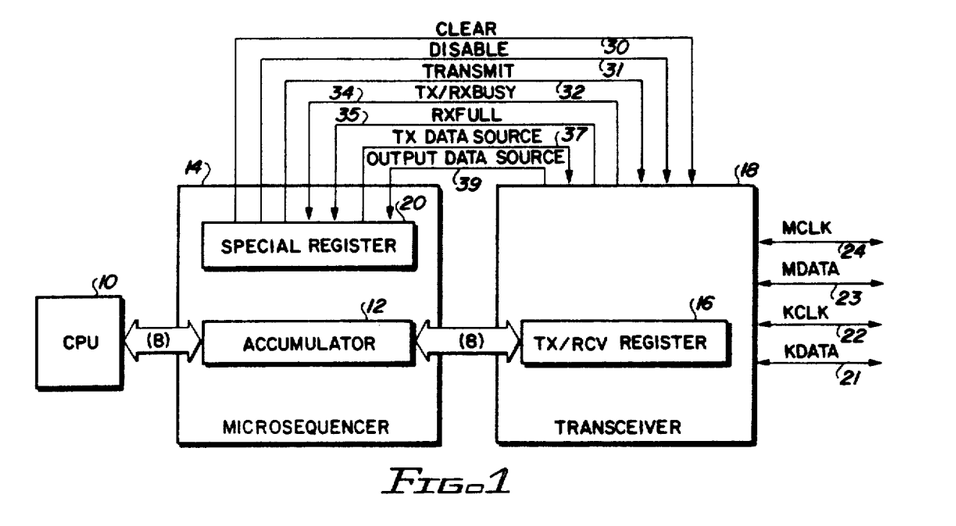
FIG. 1 is a block diagram of a preferred embodiment of the invention.

FIG. 1 is a block diagram of the system implementation of a preferred embodiment of the invention. The keyboard/mouse controller is utilized to provide a hardware interface between a CPU-10 (which may be a personal computer of either the "AT" type or the "PS/2" type) and a keyboard or keyboard/mouse combination. Information to and from the CPU-10 is applied over a multiple lead connector to an accumulator 12, located within a micro-sequencer 14, located within the controller. The accumulator 12, in turn, is interconnected through multiple internal connections to a transmit receive register 16, located within a transceiver portion 18 of the controller. As shown in FIG. 1, the transceiver 18 also provides the basic clock and data interconnections between the controller and the keyboard or keyboard/mouse over a keyboard data output lead 21, a keyboard clock lead 22, a mouse data lead 23 and a mouse clock lead 24. Other interconnections with the keyboard are described in the following discussion of other figures of the drawing.

The two portions of the controller, the micro-sequencer 14 and the transceiver 18, are interconnected to provide communication to and from a special register 20 (including mode and status functions) and the transceiver portion 18. The controller operates by interfacing the micro-sequencer 14 with the transmit receive register 16 by writing data from the accumulator 12 to the transceiver hardware register 16. The transmit operation either can be initiated by the act of writing this register in a conventional manner, or by a transmit handshake bit which can be written by micro-code. In the preferred embodiment, the operation is initiated directly by writing the register.

The status of the transceiver 18 is checked by two status bits, transmit/receive busy 34 and receive/buffer full 35, which indicate that the transceiver 18 is in the process of sending or receiving data, or has completed receiving data, respectively. This information is supplied to the special register 20 to prevent the start of another transmit before the first is finished. These status bits also are useful to permit the micro-sequencer 14 to start transmission and then execute other portions of the code. The status bits 34 and 35 are polled periodically by the special register 20 and the micro-sequencer 14, to determine if data has been received, or if the transmitter of the transceiver 18 is in use. This is a significant reduction from the code required in conventional controllers to poll the clock and data inputs and then to shift data in as described by the keyboard protocol.

The special register 20 also supplies a disable handshake bit over a lead 31 to the transceiver 18 to cause the transceiver 18 to be disabled whenever this bit is supplied by the special register 20 of the micro-sequencer 14. In addition, a clear handshake bit 30, supplied from the special register 20, is used to cancel any transmit/receive operation in process in the transceiver 18 to make way for the next transmit/receive operation. A single control bit 37 (transmit data source) is utilized to direct the transceiver 18 to which device, a keyboard or mouse, the transceiver 18 is to transmit data. Similarly, another single control bit 39 (output data source) is supplied from the transceiver to the special register 20 in the micro-sequencer 14 to notify the micro-sequencer whether the data supplied from the transceiver 18 is from a mouse or a keyboard. These two control bits, appearing on the leads 37 and 39, automatically implement through the hardware of the transceiver and micro-sequencer 14, the operation of the controller with personal computers of the two primary different types, AT or PS/2, currently in widespread use.

Figure 2:
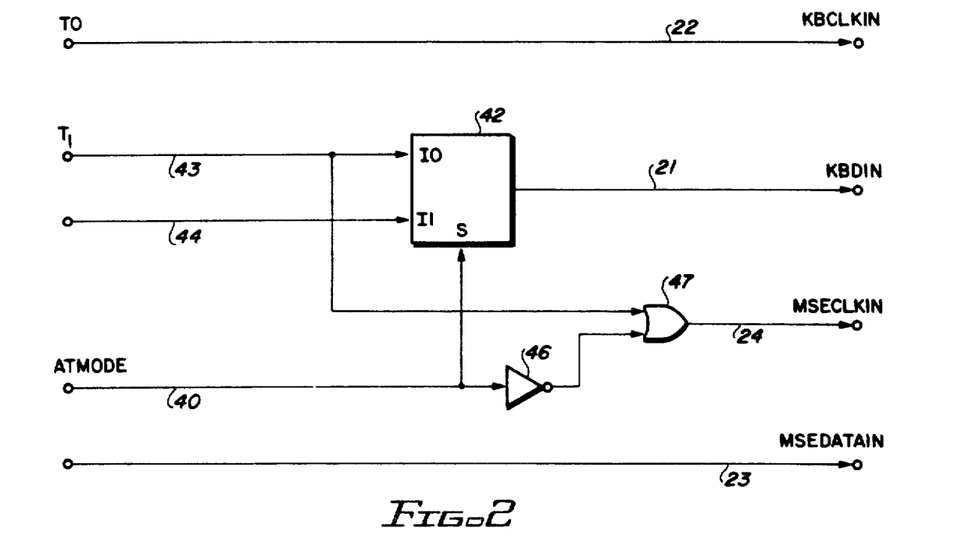
FIG. 2 is a schematic block diagram of a portion of the system of FIG. 1.

FIG. 2 is a detailed schematic diagram of a portion of the interface between the CPU 10 and the keyboard interconnection leads 21 through 24, shown in FIG. 1. Two of the leads, 22 and 23, for the keyboard clock in (KBCLKIN) and mouse data in (MSEDATAIN), respectively, interconnect directly through the system from the CPU 10 to the keyboard/mouse interface connections, irrespective of the type of personal computer used with the system. Obviously, if there is no mouse used, such as with an AT type computer, no data appears on the mouse data lead 23. In both types of computers, a keyboard always is employed, so a keyboard clock signal 22 always is present. The central portion of the circuit of FIG. 2, however, provides different output signals in accordance with the type of computer with which the system is used. If the system is interconnected with an AT type computer, the input signal on a "AT MODE" input terminal 40 is low. This low signal is applied to a two-input multiplex gate 42 to select the upper input applied to it on a terminal 43 for interconnection with the output. The output of the multiplex 42 is connected to the keyboard data in (KBDIN) lead 21, and is used to supply data to the keyboard from the CPU in accordance with the standard operation of the CPU 10. In this mode, there is no mouse, and the low signal on the lead 40 is inverted by an invertor 46, and applied to the lower one of two inputs to a NOR gate 47, the output of which constitutes the mouse clock input (MSECLKIN) lead 24. This input to the gate 47 disables the gate, so that no mouse clock signals are applied to the lead 24 when the system operates in the AT mode.

When the system is connected to a PS/2 personal computer, the signal on the AT mode input 40 is high. This enables the NOR gate 47 and also causes the signals passed through the multiplex 42 to be the signals applied over the lead 44, connected to the lower of the two inputs to the circuit 42. These signals constitute the keyboard data information supplied to the lead 21. For such a keyboard/mouse computer, however, the information on the lead 43 comprises mouse clock data. This data is not passed through the multiplex 42, since it has been switched to the lower input by the signal applied to it over the lead 40; but the signals on the lead 42 are passed through the NOR gate 47 and constitute the mouse clock input signals applied to the lead 24.

The mode switching between a personal computer having a keyboard only but no mouse and a personal computer having a keyboard/mouse combination, is effected by the single control bit or signal appearing on the AT mode lead 40. The manner in which this signal changes the nature of the signals on the leads 21 and 24 is employed throughout the system to automatically switch the controller interfaces between a CPU, such as the CPU-10 of FIG. 1, and a keyboard or keyboard/mouse, as illustrated in greater detail in FIGS. 3 through 6.

Figure 3:
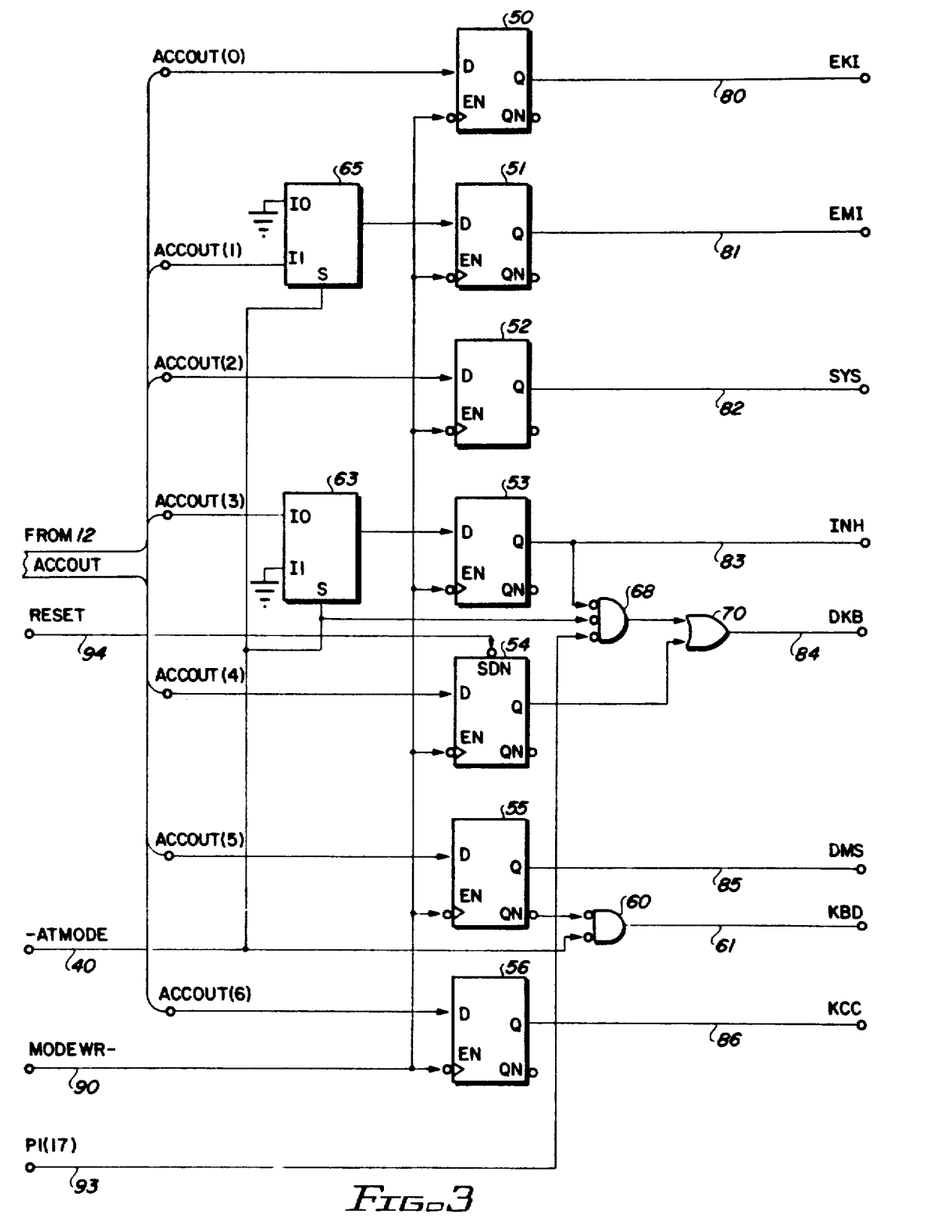
FIG. 3 is a schematic block diagram of another portion of the system of FIG. 1.

Reference now should be made to FIG. 3, which is a detailed block diagram of the mode register logic of the transmit receive register 16 and the transceiver 18. The mode determination bits from the accumulator 12 comprise accumulator output bits 0 through 6, which are applied to the respective trigger inputs of mode register bistable circuits 50 through 56.

As is readily apparent from an examination of FIG. 3, bits 0, 2, and 6 function in the same manner whether the input from the accumulator 12 is for a system connected to an AT mode personal computer or to a PS/2 mode personal computer. These accumulator bits pass directly from the accumulator to the corresponding bistable registers 50, 52, and 56 for these bits. For bits 1, 3, 4, and 5, however, the system works differently between the two modes. This is accomplished, again, by the nature of the signal on the AT mode input lead 40, which controls the operation of a pair of two-input multiplex circuits 63 and 65, and the control inputs of two NOR gates 60 and 68.

When the system is operated in an AT mode, the signal input 40 is low, enabling the NOR gates 60 and 68 to respond to the other inputs supplied to them. In addition, this low input causes the upper one of the two inputs to each of the multiplex gates 63 and 65 to be passed, respectively, to the trigger inputs of the bistable circuits 53 and 51. For the bistable circuit 51, the upper input is connected to ground, so that the output of the bistable circuit 51, appearing on the lead 81, is held low when the keyboard controller is interfaced with an AT type computer. Signals appearing on the lead 81 are "enable mouse interrupt"(EMI) and since the AT type computers do not have a mouse, this signal is not used. Similarly, the signal on the lead 85, "disable mouse" (DMS) obtained from the Q output of the bistable device 55, is used only when the system is operating in conjunction with a PS/2 type of personal computer which has a both a keyboard and mouse. This signal is of no effect whatsoever when a keyboard-only type of personal computer, such as an AT type computer, is interconnected with the keyboard controller circuit.

When the system is used with a PS/2 type of computer, the signal on the lead 40 is high. This forces the outputs of both of the NOR gates 60 and 68 to go low. The output of the NOR gate 60 on the lead 61 indicates the keyboard type. As mentioned previously, the output of the NOR gate 68 is used to enable or disable an OR gate 70 to respond to the output signals from the Q output of the bistable device 54 to provide "disable keyboard" (DKE) signals over the lead 84. These "disable keyboard" signals are utilized differently when the system is used with an AT type computer than when it is used with a PS/2 type computer. For a PS/2 type computer, the output of the NOR gate 68 is held low as a result of the application of ground potential to the trigger input of the bistable device 53. This causes the Q output of that device to be low for a PS/2 type computer. The upper input to the OR gate 70 also is continuously enabled by the output of the NCR gate 68 in this mode, since for the PS/2 mode the input on the lead 40 applied to the center one of the three inputs to the gate 68 is high. Thus, the OR gate 70 is enabled to respond to the Q output of the bistable device 54 which receives bit number 4 from the accumulator.

The signals appearing on a lead 93 constitute a control signal from the CPU for disabling and enabling the keyboard. When the signal on the lead 93 is high, the output of the NOR gate 68 is low, irrespective of the condition of the other two inputs, to enable the OR gate 70 to respond to the Q output of the bistable device 54.

The three signals which remain the same irrespective of the type of personal computer with which the system is used, constitute the Q output of the bistable device 50 which appears on the lead 80, and is an enable keyboard interrupt (EKI) signal. The output of the bistable device 52 constitutes a system flag (SYS), appearing on the output 82; and the output of the bistable device 56, appearing on the output 86 is a key code version signal (KCC). If the mode register was to be used with only one type of personal computer, such as an AT type, having a keyboard only, or a PS/2 type, having a keyboard and mouse, the mode register of FIG. 3 would be wired directly in accordance with the operating conditions for that type of computer. By utilizing the AT mode signal input 40, and the transmission multiplex circuits 63 and 65 along with the gates 60, 68, and 70, the mode register of FIG. 3 is adapted for use with either type of computer through the simple control of the binary state of the signal appearing on the terminal 40, as described above.

Figure 4:
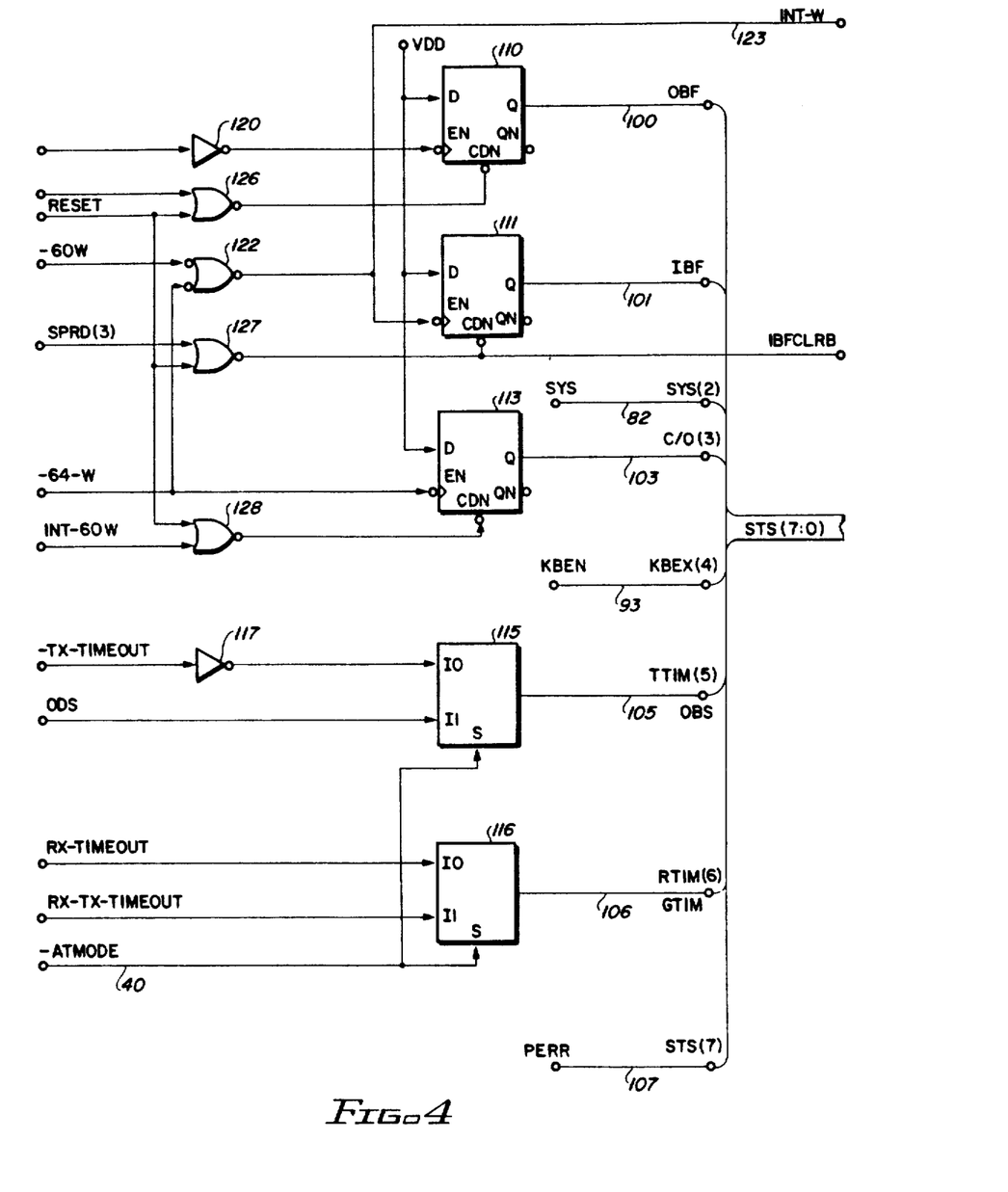
FIG. 4 is a schematic block diagram of the status register portion of the system of FIG. 1.

Reference now should be made to FIG. 4, which is a schematic block diagram of a status register of the system for indicating the status of the keyboard/mouse transmit and receive operation of the keyboard or keyboard/mouse interfaced with the computer by the keyboard controller. The status register provides eight output bits (bit 0 through bit 7). Bits 0 through 4, and 7 are the same for both modes of operation of the controller. Bits 5 and 6 differ, in accordance with whether the controller is operating in an AT mode (keyboard only) or a PS/2 mode (keyboard/mouse) type of operation. The status register of FIG. 4 comprises a part of the transceiver 18 of the controller shown in FIG. 1. The status register provides eight output signals, shown as supplied to an output read-only port over the output leads or terminals 100, 101, 82, 103, 84, 105, 106, and 107, respectively. The signals appearing on the leads 82 and 93 are the same as those signals appearing on the correspondingly numbered terminals of the mode register of FIG. 3. The output signals on the leads 100, 101, 82, and 103, corresponding to bits 0 through 3 of the status register, are the same, whether the controller is used with an AT type personal computer and keyboard or with a PS/2 type personal computer and keyboard/mouse.

Bit 0 appearing on lead 100 indicates whether the output buffer is full or empty. When this signal (OBF) is low, or a binary 0, the buffer is empty and when it is high or a binary 1, the buffer is full. This signal is obtained from the Q output of a bistable device 110, the D input of which is enabled along with corresponding D inputs of bistable devices 111 through 113, by connecting these inputs directly to a positive potential source VDD. When the output buffer is full, a signal is applied through an invertor 120 to the enable input of the bistable device 110 to change its state from a normal "low" state to a high state indicative of a full buffer. This output or flag is set whenever the micro-sequencer 14 loads the data buffer output. The signal is cleared in response to a reading of the buffer output which enables a NOR gate 126 for operation or when a reset pulse is applied to the second or lower input of the NOR gate 126. At the time the reset pulse is applied, the bistable device 110 is set back to its initial or "low" output state of operation.

Bit 1 of the status register output appears on output lead 101 and represents input buffer full (IBF). This output is set from a normal low or "0" binary condition to a high or binary "1" whenever the input buffer for the accumulator 12 is full. The signal is provided by the bistable device 111 which operates in a manner similar to the operation discussed for the device 110. This signal is set on a write signal to either of two different input ports which form the inputs to a NOR gate 122. The output of the gate 122 also appears on an output lead 123. The bistable device 111 is set back to its low or "0" condition when it is cleared at the time the micro-sequencer 14 reads the data buffer input contents into the accumulator 12. This occurs with the presence of a reset pulse or an input from the micro-sequencer to the inputs of the reset NOR gate 127.

Bit 2 is the system flag (SYS) appearing on Terminal 82, described previously in conjunction with FIG. 3. This signal indicates that the CPU has changed from a virtual to a real mode of operation when a high binary "1" signal is present on it.

Bit 3 appears on lead 103 and is a command/data (C/D) signal. When a binary "1" appears on this lead, it indicates that a command has been placed into the input data buffer of the controller. A binary "0" indicates data. The reset signal for the bistable device 113 is obtained from the output of a NOR gate 128 in the same manner as the reset signals for the bistable devices 110 and 111, described previously.

Bit 4 appearing on lead 84 is the same as the output 93 of FIG. 3, and is the keyboard enable switch (KBEN). The keyboard is disabled when a low binary "0" appears on this lead and is enabled when a high or binary "1" signal appears on lead 84. The manner in which this signal is generated is shown in FIG. 3 for the mode register.

Bits 0 through 4 which have been described above as appearing on the leads 100, 101, 82, 103, and 84, are the same, irrespective of the type of personal computer with which the controller is used. The next two bits, bit 5 and bit 6, appearing on leads 105 and 106, however, differ in accordance with the type of personal computer with which the system is being used. The mode is established by the signal appearing on the AT mode lead 40 which, as mentioned previously, is low when the system is used with a personal computer, such as the AT computer, having a keyboard only and no mouse. The signal on the lead 40 is high when the system is used with a keyboard/mouse combination data input device.

Initially, assume that the signal on the lead 40 is low. This signal then is applied to two two-input multiplex gate circuits 115 and 116 to cause these circuits to pass signals appearing on their upper inputs through to the outputs corresponding to the leads 105 and 106 for bit 5 and bit 6. When the system is operating in the AT mode, bit 5 appearing on the lead 106 corresponds to the transmit time out (TTIM) signal. When the operation system is normal, this is a low or binary "0" signal, and when time out has occurred, this signal is a high or binary "1." The signal is obtained from a time out signal provided by the transceiver 18 through an invertor 117 to the multiplex circuit 115.

Similarly, in the AT mode, bit 6 appearing on lead 106 is obtained through the upper one of the two inputs of the multiplex gate 116 and corresponds to a receive time out (RTIM). A binary "1" indicates that a time out has occurred, and a binary "0" signal on this lead indicates that the receive time out condition is normal.

When the system is used with a keyboard/mouse input, the AT mode signal on the lead 40 is high, and the multiplex gates 115 and 116 are switched to respond to the signals appearing on the lower ones of the two inputs shown for these gates. Consequently, the signal for bit 5 appearing on lead 105 then corresponds to an indication of the output data source (ODS) of information applied to the lower input terminal of the gate 115 to indicate whether the output buffer is a keyboard ("0") or a mouse ("1"). Similarly, the time-out function which is supplied to the output lead 106 for bit 6 of the signal is obtained from an input to the lower input of the multiplex gate 116 and constitutes a general time-out (GTIM) or time-out error, rather than the transmit time-out which is used for an AT triode type of CPU 10.

The final or eighth bit of the status register signal appears on the lead 107 and is the same regardless of the type of computer with which the controller is used. This bit is a parity error bit which is obtained in conventional fashion, and an error is indicated if a high or binary 1 signal appears on the lead 107.

Figure 5:
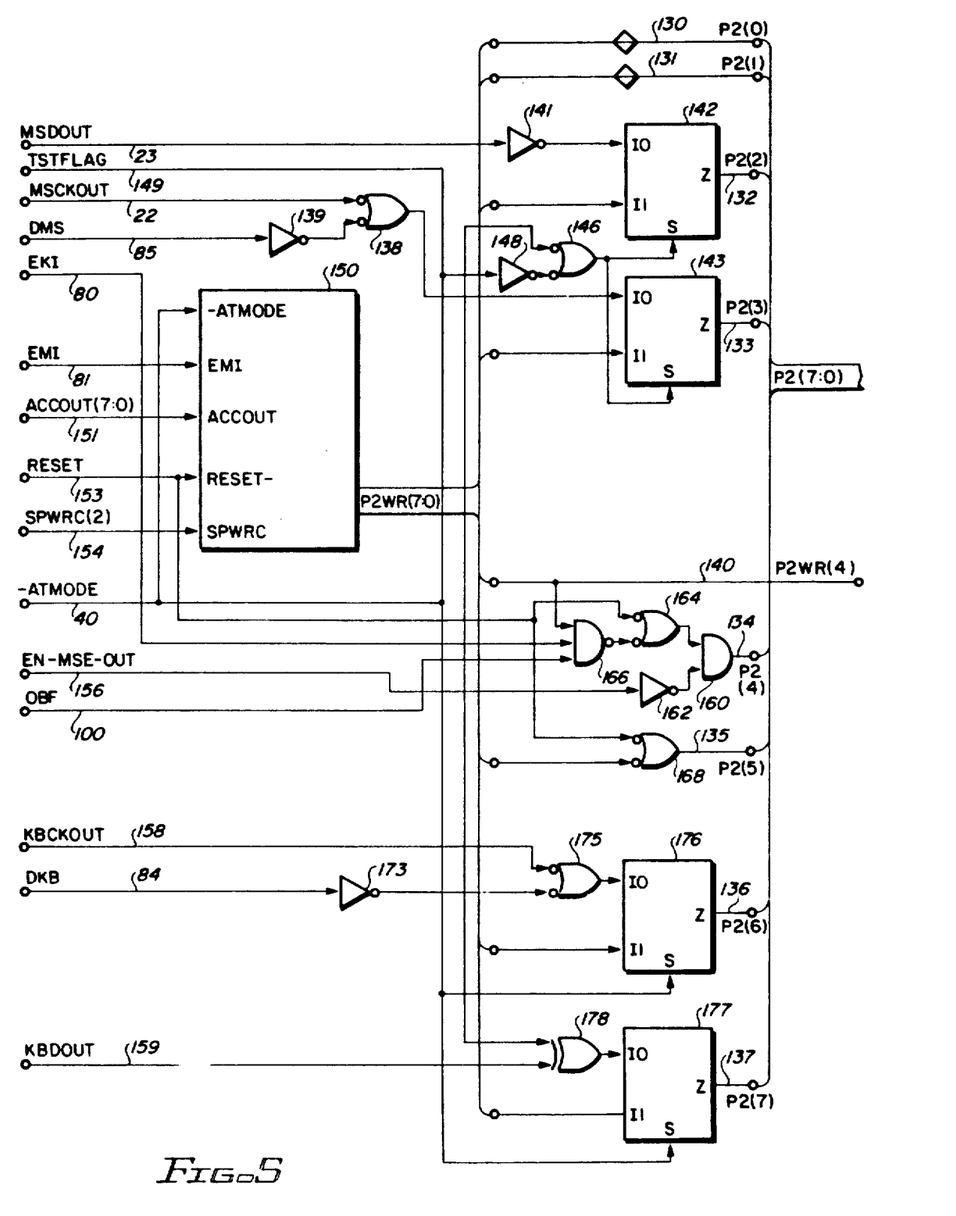
FIGS. 5 and 6 together comprise a block diagram of the transmit/receive register of the transceiver portion of the system. shown in FIG. 1.
Figure 6:
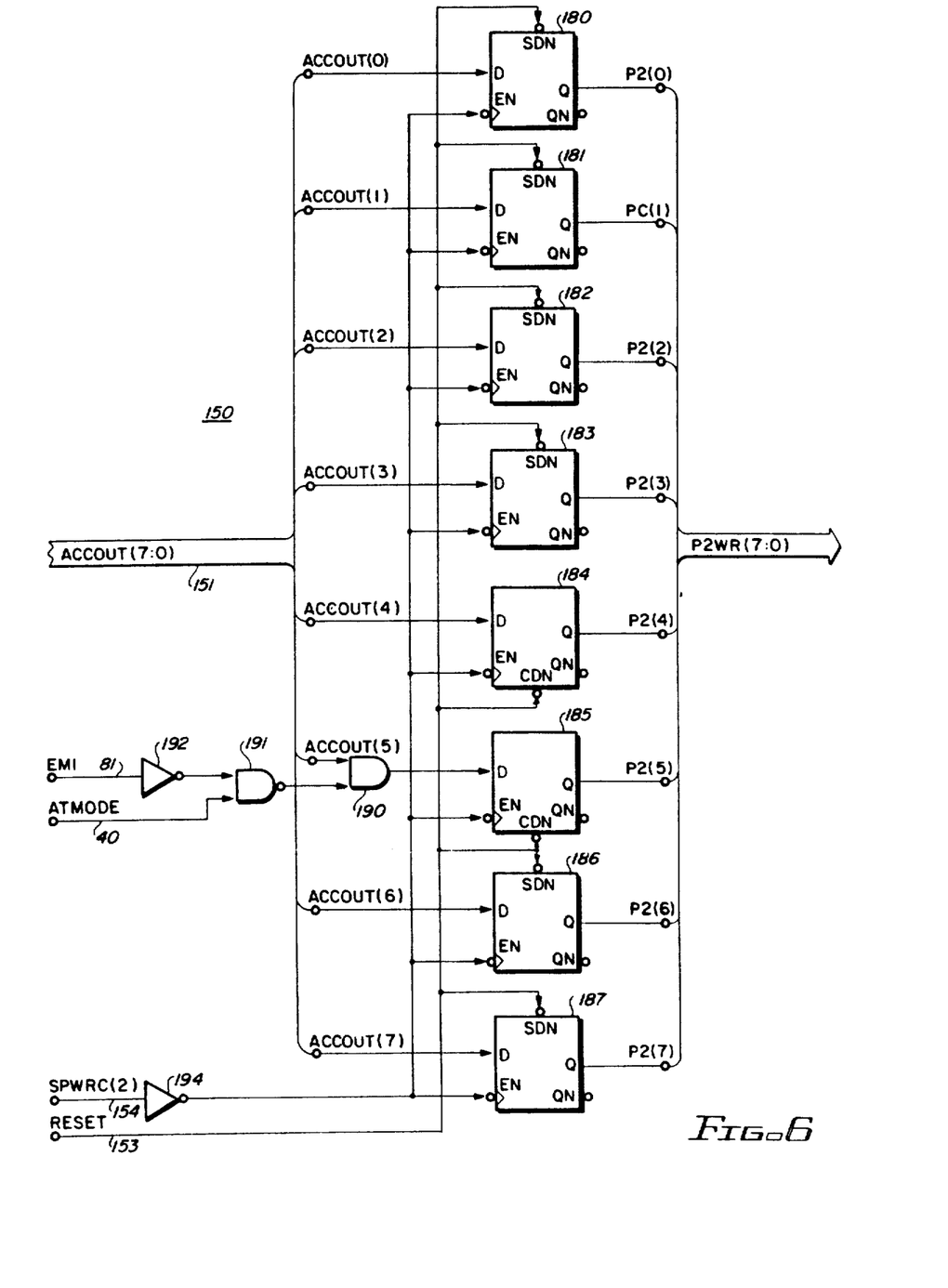

Reference now should be made to FIGS. 5 and 6, which together comprise the output logic for an output port (P2) interconnecting the transceiver 18 with a keyboard or keyboard/mouse device. Before entering into a detailed discussion of the circuits shown in FIGS. 5 and 6, it should be noted that the eight output signals supplied to the P2 port by the circuit of FIGS. 5 and 6 operate to treat bits 0, 1, 4, and 6 in the same manner, irrespective of the mode of operation of the system, that is, whether it is operated as an AT type of computer keyboard controller or a PS/2 computer keyboard/mouse controller.

Bits 2, 3, 5, and 7, however, work differently between the AT and PS/2 modes of operation. Bit 2 is driven by a mouse data out (MSDOUT) in the PS/2 mode and is a general purpose output written by the accumulator 12 in the AT mode. Bit 3 is driven by mouse clock out (MSCKOUT) in the PS/2 mode and also is a general purpose output in the AT mode. Bit 5 is gated with enable mouse interrupt (EMI) in the PS/2 mode and is written by the accumulator 12 directly in the AT mode. Finally, bit 7 is driven by keyboard out (KBDOUT) in the AT mode and is inverted for operation in the PS/2 mode.

As with the circuits of FIGS. 3 and 4 directed to the mode and status registers, respectively, the routing of the various signals to the P2 output port, indicated by the output leads on the right hand side of FIG. 5, is accomplished by means of latches located within a latch circuit 150, gates, and two input multiplex circuits. The basic mode control for the circuit of FIG. 5 is, again, effected by the signal on the AT mode lead 40. When this signal is low, the system is operated in the AT mode, and when the signal is high, the system, is operated in its PS/2 mode of operation, as described previously. In FIG. 5 this signal is shown as applied to the upper input of an Exclusive OR gate 178, which supplies signals to the upper input of the two input multiplex gate 177. The AT mode signal on the lead 40 also is applied to the upper input of a NAND gate 146, which controls the operation of a pair of two-input multiplex gates 142 and 143 to cause them to respond to signals on the upper inputs when the system is in the AT mode, and to respond to the signals on the lower inputs when the system is in the PS/2 mode, with a high or binary "1" potential appearing on the lead 40. Completion of the control of the two input multiplex gates 142, 143, 176, and 177 is effected by means of the test flag signal appearing on the lead 149. This signal is applied directly to the control inputs of the multiplex gates 176 and 177, and is inverted by an invertor 148 and applied to the lower input of the NAND gate 146 where it is combined with the signal on the AT mode terminal 40 to control the multiplex circuits 142 and 143.

In addition, referring to FIG. 6, the AT mode signal is applied over the lead 40 to control the operation of the bistable latch 185 for bit 5 of the bistable latching circuits consisting of latches 180 through 187. These latches produce intermediate output port signals (P2WR) used in the remainder of the circuit of FIG. 5. The signals for all of the latches 180 through 184, 186, and 187 are applied to the trigger inputs of these latches from the corresponding output of the accumulator 12 as applied over the leads 151 shown in FIGS. 5 and 6.

For latch 185, (bit 5) the accumulator signals are applied to one input of an AND gate 190, the other input to which is provided by the output of a NAND gate 191. The AT mode signal is applied to the lower input of the NAND gate 191, so that when the system is operated in the AT mode (lead 40 "low") the NAND gate 191 supplies a constant high enabling potential to the lower input of the AND gate 190. Thus, in the AT mode, the signals supplied to the latch 185 are written directly in accordance with the output of the accumulator 12 (over a lead 151) applied to the upper input of the AND gate 190. When the system is operated in the PS/2 mode, however, the signal on the terminal 40 is high, so that it is gated with the enable mouse interrupt (EMI) signal on the terminal 81 applied through an invertor 192 to the upper terminal of the NAND gate 191, which then combines this signal with the accumulator signal to provide the drive input to the latch 185. Reset signals for the latches 180 through 187 are applied over the lead 153 to the various latches as indicated in FIG. 6, and enable signals for all the latches are obtained over the lead 154 and through an invertor 194 to cause the latches within the circuit 150 to be responsive in synchronism with the desired operation of the system.

The operation of the multiplex circuits 142 and 143 of FIG. 5 is coordinated between the inputs appearing on the AT mode input lead 40 and the test lead 149. When the system is operated in the AT mode, the signal on the lead 40 is low, as described previously. This low input signal is applied to the upper input terminal of the NAND gate 146. In addition, when the test flag 149 goes high, this signal is inverted by the invertor 148 to apply a second low signal to the input of the NAND gate 146. The output of the gate 146 then goes high to cause the selection of the inputs to the multiplex circuits 142 and 143 to be the lower of the two inputs, causing both of these inputs to be the general purpose accumulator signals obtained from the corresponding outputs of the bistable latches 182 and 183 in the circuit 150. These inputs are passed directly through to the outputs 132 and 133.

When the system is operated in the PS/2 mode, the signal on the AT mode terminal 40 goes high, thereby forcing the output of the NAND gate 146 to go low if the test flag is low also. In this condition of operation, the upper inputs to the multiplex circuits 142 and 143 are selected to be connected with the outputs 132 and 133, respectively. As shown in FIG. 5, the upper input for the circuit 142 is the mouse data output (MSDOUT) on the lead 23 which is inverted by the invertor 141 to provide the signal on the "Bit 2" output lead 132 of the circuit. Similarly, the upper input to the multiplex circuit 143 is obtained from a NAND gate 138 which is supplied with a mouse clock output (MSCKOUT) on the lead 22, forming one input to a NAND gate 138 and the disable mouse signal (DMS) on the lead 85 after passing through an invertor 139. Effectively, except when the mouse is disabled, the mouse clock signals are passed through the multiplex circuit 143 to form Bit 3 on the output terminal 133 when the system is operated in its PS/2 mode.

Bit 4, appearing on lead 134, essentially is representative of the status of the output buffer (OBF) providing a signal on the input 100. In addition, the enable mouse output signal (ENMSEOUT) appearing on an input 156 is used when the system is operated in the PS/2 mode. This is accomplished by the combination of the AND gate 160 supplied with the inverted enable mouse output on the lead 156 through an invertor 162 on one input, and supplied with the output of a NAND gate 164 which, in turn, is controlled by the output of NAND gate 166. The gate 166 is responsive to the enabled keyboard interrupt signal (EKI) on the lead 80 and the status of the output buffer signals appearing on the lead 100, along with the intermediate Bit 4 from the accumulator as it is latched into the bistable latch 184 in the circuit 150.

Bit 5 is responsive to the status of the reset signal 153 and the intermediate Bit 5 applied to the two inputs, respectively, of a NAND gate 168 to produce the Bit 5 output on the lead 135. As mentioned previously in conjunction with FIG. 6, Bit 5 is gated with enable mouse interrupt (EMI) on the lead 81 to control the signal in the latch 185 of the circuit 150.

Bit 6, appearing on the output lead 136, is obtained from the multiplex circuit 176. Inputs to the circuit 176 are obtained directly from the corresponding latch 186 of the circuit 150 and the combination of the inverted disable keyboard signal (DKB) on the lead 84 combined with the keyboard clock 158 in a NAND gate 175. The disable keyboard signal is inverted by an invertor 173 prior to the application of this signal to the lower input of the NAND gate 175.

The final bit, bit 7, which appears on lead 137 is obtained from the multiplex circuit 176. As mentioned previously, this bit is driven by the keyboard output signal (KBDOUT) on the lead 159, which comprises one of two signals to an Exclusive OR gate 178, the other input to which is the signal appearing on the AT mode terminal 40. When the system is operated in the PS/2 mode, Bit 7 is inverted.

Various changes and modifications will occur to those skilled in the art, without departing from the true scope of the invention. For example, different combinations of gates, bistable latches, and multiplex gate circuits have been described, different logic configurations using different types of gates and different arrangements of the bistable circuits and multiplex gates may be employed to achieve the same results. It should be noted that the system control from one mode of operation to another, substantially is effected by the control signals on the AT mode input terminal, although this control could be obtained from other types of switching arrangements if desired. The utilization of the two different states of signals appearing on this terminal for the purpose of configuring the controller from one form to another, however, has been found to achieve the desired purpose and results efficiently and effectively. The foregoing description should be considered illustrative of the invention and not as limiting, with the true scope of the invention defined in the appended claims.

We claim:

1. A combination keyboard and keyboard/spatial input device controller system for use with a first type of computer operated from a keyboard alone and with a second type of computer operated from a keyboard/spatial input device combination, said system including in combination:

hardware controller circuit means for interconnection between a computer and input devices comprising a keyboard and spatial input device for a first mode of operation and a keyboard-only for a second mode of operation said hardware controller circuit means including at least one set of a plurality of input terminals, and at least one set of a plurality of output terminals with gating means connected therebetween to provide different circuit interconnections between said input terminals and said output terminals; and means coupled with said gating means to operate said gating means to interconnect different predetermined ones of said input terminals with said output terminals for selectively and differently configuring said controller circuit means to said first and second modes of operation.

2. The combination according to claim 1 wherein said gating means comprise a plurality of transmission gates, each having first and second inputs and an output, and wherein said means for selectively configuring the operation of said controller circuit means operates to cause each of said transmission gates to interconnect one of the inputs thereof with the output thereof in said first mode of operation, and to connect the other of the inputs thereof to the output thereof in said second mode of operation.

3. The combination according to claim 2 wherein said means for selectively configuring the operation of said hardware controller circuit means simultaneously operates all of said transmission gates to said first mode of operation with said configuring means in a first state of operation and to said second mode of operation with said configuring means in a second state of operation.

4. The combination according to claim 1 wherein said hardware controller circuit means includes mode register means for providing interconnections between selected input terminals and output terminals indicative of said first or second modes of operation, and status register means for providing interconnections between other selected input terminals and output terminals indicative of the status of operation of said controller circuit means.

* * * * *